L. KREZOLEK.
RESILIENT WHEEL.
APPLICATION FILED JULY 5, 1917.
1,247,283.
Patented Nov. 20, 1917.
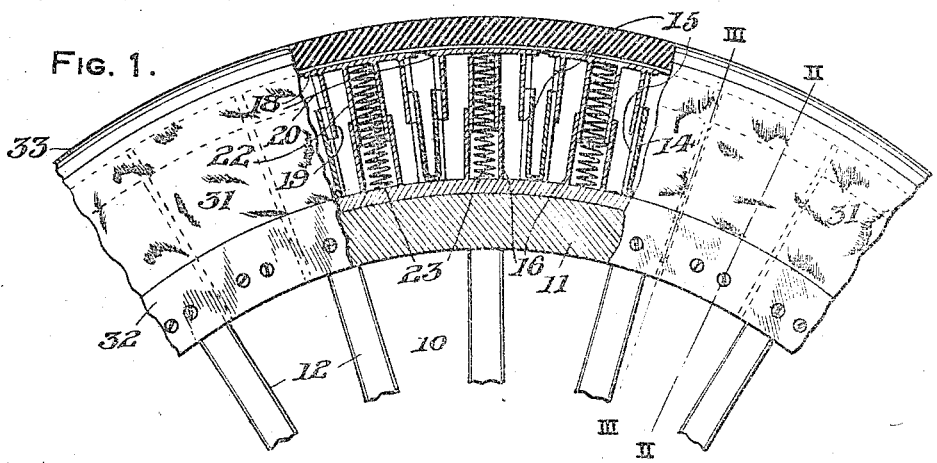
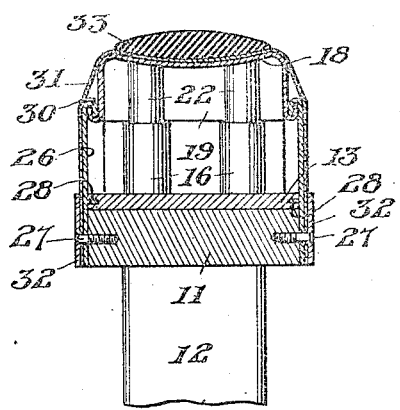
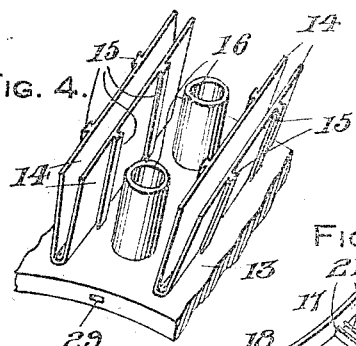
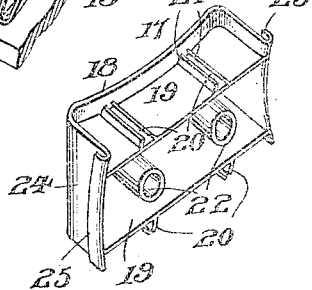
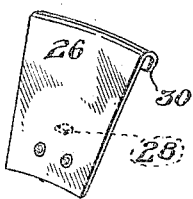
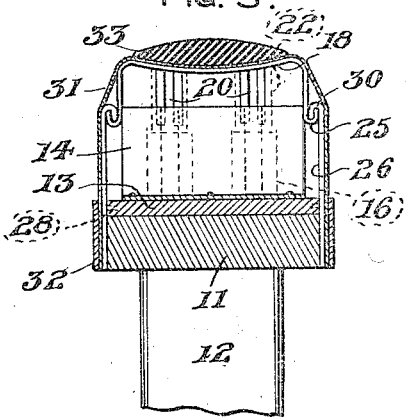
Inventor
L. Krezolek
By N. M. Wilson
Attorney

UNITED STATES PATENT OFFICE.

LUDWIK KREZOLEK, OF CLEVELAND, OHIO.

RESILIENT WHEEL.

1,247,283.  Specification of Letters Patent.  Patented Nov. 20, 1917.

Application filed July 5, 1917. Serial No. 178,602.

*To all whom it may concern:*

Be it known that I, LUDWIK KREZOLEK, a subject of the Emperor of Austria, residing at Cleveland, in the county of Cuyahoga and State of Ohio, have invented certain new and useful Improvements in Resilient Wheels, of which the following is a specification.

This invention relates to certain new and useful improvements in resilient wheels.

The primary object of the present invention is the provision of a resilient wheel possessing great strength and stability and being easy and inexpensive to manufacture which affords all of the advantages of a pneumatic tire but is free from punctures and blowouts, as the same employs no pneumatic member.

A further object of the invention is the provision of a resilient road engaging portion for a wheel whereby the shocks and jars incident to travel are absorbed without being imparted to the vehicle, the present structure suitably providing a multiple of tread-supporting members and having but few parts and the device being substantially free from getting out of order.

With these general objects in view and others that will appear as the nature of the invention is better understood, the same consists in the novel construction, combination and arrangement of parts hereinafter more fully described, illustrated in the accompanying drawings, and pointed out in the appended claims.

In the drawing forming a part of this application and in which like designating characters refer to corresponding parts throughout the several views:—

Figure 1 is a side elevational view, partly in section, of a portion of a wheel illustrating the present invention, Figs. 2 and 3 are radial sectional views taken upon lines II—II and III—III of Fig. 1.

Fig. 4 is a perspective view of a portion of the mounting member carried by the felly, Fig. 5 is a perspective view of one of the tread members carried by the supporting members and Fig. 6 is a perspective view of one of the side plates employed.

Referring more in detail to the drawing, a wheel 10 is illustrated having a felly 11 and spokes 12 of the usual form while a rim 13 is mounted upon the felly 11. Spaced V-shaped supporting plates 14 are transversely arranged upon the rim 13 having spaced dovetail ribs 15 upon their outer faces while spaced tubes 16 are arranged upon the rim 13 between the plates 14.

A tread member 17 of the form best illustrated in Fig. 5 of the drawing is slidably mounted between each adjacent pair of plates 14, each of the members 17 being in the form of a box with its closed side 18 forming an outwardly positioned tread supporting portion while the sides 19 thereof are provided with dovetail groove 20 formed by means of ribs 21 carried by said sides and being for the purpose of slidably mounting the same upon the plates 14 with the ribs 15 slidably positioned within the groove 20.

Inwardly projecting posts 22 are arranged within the members 17 mounted upon the inner face of the closed side 18 thereof, the said posts 22 being adaptable for sliding reception within the tubes 16 with springs 23 inclosed therein, whereby the tread members 17 are resiliently mounted upon the rim 13.

The ends 24 of the tread members 17 have outturned marginal flanges 25 at the opposite sides of the wheel adapted for restraining engagement by means of side plates 26 which are secured to the felly 11 by means of screws 27 and have side lugs 28 arranged within side sockets 29 in the rim 13, it being understood that inwardly extending flanges 30 are arranged upon the outer ends of the plates 26 overlying the flanges 25 of the tread members.

A flexible member 31 formed of such material as leather or canvas is positioned overlying the tread members 17 and the side plates 26 and has its marginal edges secured in position by means of opposite flat rings 32, through which rings 32 and the fabric 31 the aforementioned screws 27 are extended. The outer sides 18 of the tread members 17 are slightly curved longitudinally of the tread members and transversely of the wheel for accommodating a rubber tread or tire 33 which is carried by the tread portion of the flexible coverings 31 and arranged around the wheel upon the tread members 17.

The complete operation of the device will be apparent from this detailed description thereof, it being seen that the tread members 17 are resiliently mounted in guided relations upon the rim 13 and slightly spaced apart for radial movement thereon, the tire 33 being adapted to travel upon the ground during the movement of the wheel 10 and the covering 31 protecting the tread members and the plates 26 and preventing dirt and other matter from collecting within the device.

A serviceable wheel structure is arranged for resiliently supporting loads and while the form of the invention herein illustrated, is believed to be preferable, minor changes may be made therein without departing from the spirit and scope of the invention as claimed.

What I claim as new is:—

1. A resilient wheel comprising a felly, a rim mounted thereon, spaced V-shaped plates projecting outwardly of and transversely carried by said rim, spaced ribs upon the opposite sides of said plates, box-shaped tread members having outer closed curved sides and with opposite sides normally arranged between the said plates, spaced ribs upon the opposite sides of said tread members forming grooves therebetween in which the said first named ribs are adapted for positioning with the tread members slidably mounted upon said plates when the device is assembled, and resilient means between the said tread members and rim.

2. A resilient wheel comprising a felly, a rim mounted thereon, spaced V-shaped plates projecting outwardly of and transversely carried by said rim, spaced ribs upon the opposite sides of said plates, box-shaped tread members having outer closed curved sides and with opposite sides normally arranged between the said plates, spaced ribs upon the opposite sides of said tread members forming grooves therebetween in which the said first named ribs are adapted for positioning with the tread members slidably mounted upon said plates when the device is assembled, telescoping tubes and posts carried by said tread members and rim, and springs arranged within said tubes and posts in contact with said tread members and rim.

3. A resilient wheel comprising a felly having a rim thereon, tread members positioned outwardly thereof, cushion springs arranged therebetween, flanges upon the inner edges of the ends of said tread members, the said rim having side sockets therein, plates attached to the felly with outer flanges adapted for overlying the said end flanges, lugs upon said plates arranged within said sockets when the device is assembled, a flexible covering member overlying the said tread members and plates, securing means engaging the said flexible member and plates and mounted on said felly, and a tire carried by said flexible member outwardly of and in supported relation with respect to the said tread members.

In testimony whereof I affix my signature in presence of a witness.

LUDWIK KREZOLEK.

Witness:
DOMINIK TYCZKOWSKI.

Copies of this patent may be obtained for five cents each, by addressing the "Commissioner of Patents, Washington, D. C."